Aug. 11, 1925.  
S. E. HORTON  
1,548,949  
CHUCK  
Filed May 29, 1924
Fig. 1.
Fig. 2.
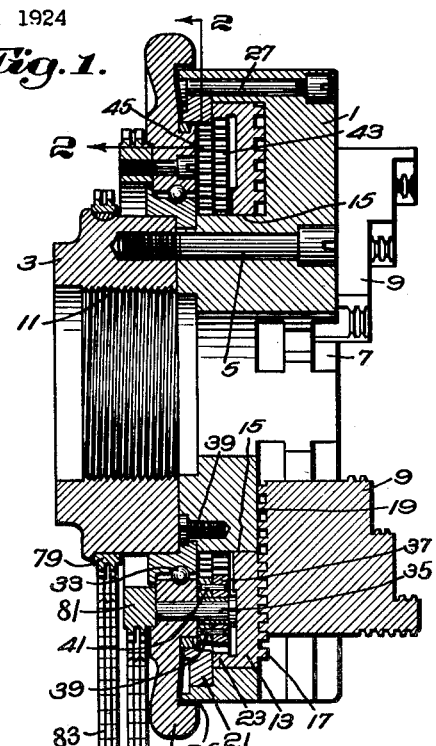
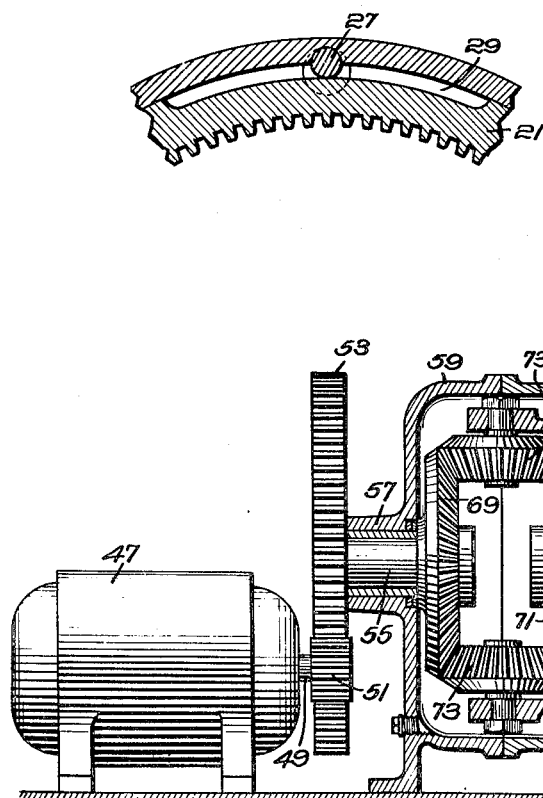
Inventor:  
Sidney E. Horton.  
by Emery Booth Janney Varney  
Attys.

Patented Aug. 11, 1925.

1,548,949

UNITED STATES PATENT OFFICE.

SIDNEY E. HORTON, OF WINDSOR LOCKS, CONNECTICUT, ASSIGNOR TO THE E. HORTON & SON COMPANY, OF WINDSOR LOCKS, CONNECTICUT, A CORPORATION OF CONNECTICUT.

CHUCK.

Application filed May 29, 1924. Serial No. 716,791.

*To all whom it may concern:*

Be it known that I, SIDNEY E. HORTON, a citizen of the United States, and a resident of Windsor Locks, in the county of Hartford, State of Connecticut, have invented an Improvement in Chucks, of which the following description, in connection with the accompanying drawings, is a specification, like characters on the drawings representing like parts.

My invention relates to chucks and is particularly concerned with the jaw operating means of a lathe chuck.

My invention will be best understood from the following description when read in light of the accompanying drawings of a specific embodiment of my invention selected for illustrative purposes, while the scope of my invention will be more particularly pointed out in the appended claims.

In the drawings:—

Fig. 1 shows a longitudinal section of a chuck and associated mechanism for operating the jaws; and Fig. 2 is a fragmentary section on the line 2—2 of Fig. 1.

Referring to the drawings showing the particular embodiment of my invention selected for illustrative purposes I have shown a chuck which comprises a body having the forward section 1 and the rearward section 3, these sections being held in assembled relation by means of bolts 5, one of which is shown in Fig. 1. On the forward face of the body section 1 are radially disposed slots 7 which slidingly support the chuck jaws 9. The rearward body section is provided with the screw threaded portion 11 for securing the chuck to a lathe spindle.

For operating the jaws I provide a scroll wheel 13 which is rotatably supported upon the body in an annular groove 15 formed on the rearward face of the body member 1. The forward face of the scroll wheel is provided with the scroll cam 17 which meshes with suitably formed rack teeth 19 on the rearward side of the jaws so that when the scroll wheel is rotated the jaws will be moved radially toward or away from the axis of the chuck, the direction of movement depending upon the direction of rotation of the scroll wheel.

For holding the scroll wheel in the annular groove 15 I provide a ring 21 which abuts the rearward face of the rearwardly extending peripheral flange 23 formed on the scroll wheel. The ring 21 is mounted in the annular enlargement 25 of the groove 15 and is held in position by means of bolts 27. Preferably the peripheral surface of the ring 21 is formed with arcuate grooves 29 through which the bolts 27 pass for the purpose of allowing the ring to have a limited rotative movement relatively to the chuck body.

For rotating the scroll wheel I provide a rotary part, herein exemplified by the hand wheel 31 which is mounted on the ball bearings 33 carried by the chuck body so as to be rotatable relatively to the chuck body. The hand wheel is provided with the forwardly extending studs 35, one of which is shown in Fig. 1, these studs rotatably carrying differential pinions. Each pinion comprises a spur gear 37 and a slightly smaller spur gear 39, the spur gears being riveted together by means of pins 41 to prevent their relative rotation. On the peripheral flange 23 of the scroll wheel I form an internal spur gear 43 which meshes with the spur gear 37, and on the ring 21 an internal spur gear 45 which meshes with the spur gear 39.

In consequence of the above described construction when the hand wheel 31 is rotated relatively to the chuck body the differential pinions will be rotated bodily and at the same time caused to rotate axially, in consequence of which the scroll wheel is rotated at a much smaller speed than the speed of the hand wheel. The lost motion connection between the chuck body and the ring 21 afforded by the bolts 27 and arcuate grooves 29 permits the hand wheel initially to move without imparting rotation to the scroll wheel until the lost motion is taken up, whereupon the sudden arresting of motion of the ring 21 imparts a hammer blow to the jaws which is useful in releasing the jaws from the work or for causing them to firmly grip the work. It will also be understood that the hand wheel normally will rotate with the chuck body by reason of the fact that the transmission between the hand wheel 31 and the jaws is self locking in the sense that effort must be applied to the hand wheel to cause it to move relatively to the chuck body.

Preferably I operate the chuck jaws by power, the power element being herein exemplified by a reversible electric motor 47 having a power delivery part herein exemplified by the armature shaft 49. The armature shaft carries a driving pinion 51 which meshes with a larger gear 53, the latter being carried by the end of a shaft 55 mounted for rotation in a bearing 57 at the end of the casing 59. At the end of the casing opposite the bearing 57 is a bearing 61 which rotatably supports a sleeve 63 attached to a planetary gear carrier 65 located interiorly of the casing. Mounted in the sleeve 63 for rotation relatively thereto is a shaft 67. Internally of the casing the shafts 55 and 67 respectively carry bevel gears 69 and 71, while the carrier 65 rotatably supports planetary pinions 73 meshing with the gears 69 and 71. Exteriorly of the casing the sleeve 63 carries a sprocket wheel 75, and the shaft 67 a sprocket wheel 77. In the same plane as the sprocket wheel 75 the chuck body carries in non-rotatable relation thereto a sprocket wheel 79, and the hand wheel a sprocket wheel 81. About the sprocket wheels 75 and 79 is passed a chain 83, and about the sprocket wheels 77 and 81 a chain 85. Preferably, although not necessarily, the gear ratio afforded by the sprocket wheels 75—79 is twice the gear ratio afforded by the sprocket wheels 77—81.

When the chuck is rotated the hand wheel 31 and the chuck body normally rotate as a unit, and in consequence the differential gear carrier and the gear 71 are driven in the same direction. The resultant of the motions of the gear carrier and gear 71 is imparted to the gear 69, and if the gear carrier rotates at one-half the speed of the gear 71 this resultant is zero revolutions no matter what the speed of the chuck or the direction in which it rotates; or, in other words, no rotation will be imparted by the chuck the armature shaft 49 of the motor.

When it is desired to operate the jaws of the chuck by power the motor is energized, the motor being reversible for the purpose of opening or closing the jaws. Energizing the motor drives the gear 69 which will decrease or increase the speed of rotation of the gear 71, and in consequence will cause the hand wheel either to rotate more slowly or faster than the chuck body, this of course depending upon the direction of rotation of the motor. When the gear ratio of the sprocket wheels is in the ratio of 2—1 as heretofore explained the rotation of the hand wheel relatively to the chuck body will be independent of the speed of rotation of the chuck and dependent only upon the speed of rotation of the motor, which is to say that no matter what the speed of rotation of the chuck the hand wheel for a given motor speed will always rotate at the same speed relatively to the body of the chuck.

Although I have described for purposes of illustration one specific embodiment of my invention it is to be understood that I am not limited thereby to its particular mechanical details, but that within the scope of my invention wide deviations may be made therefrom without departing from the spirit of my invention.

Claims:

1. The combination with a chuck having a body, jaws and jaw operating mechanism, of a motor, gearing comprising differential mechanism permanently connecting said motor to both said chuck body and said jaw operating mechanism, and said gearing being of such ratio that said motor is stationary when said chuck is rotated and said jaws are at rest relatively to said chuck body.

2. The combination with a chuck having a body, jaws and jaw operating mechanism, of a reversible motor having a single driving member, power transmission means permanently connecting said driving member to both said chuck body and jaw operating mechanism, and said power transmission means preventing rotation of said driving member when said chuck is rotating and said motor is not energized.

3. The combination with a chuck body, of work gripping means, a member normally rotating in synchronism with said body and mounted for rotation relatively to said body, operating mechanism for said work gripping means actuated by rotation of said member relatively to said body, power means comprising a single rotary power delivery part, and power transmission means for causing said power delivery part to drive said member relatively to said chuck body at a speed proportional only to the speed of said power delivery part.

4. The combination with a chuck body, of work gripping means, a member mounted for rotation relatively to said body for operating said work gripping means, mechanism for transmitting such relative rotation of said member to said work gripping means, said mechanism automatically locking whereby said member will normally rotate at a speed bearing a fixed relation to the speed of rotation of said body, a motor having a single rotary power delivery member; and differential gearing having relatively rotatable parts respectively connected to said chuck body, said member and said power delivery part.

5. The combination with a chuck body, of work gripping means, a member mounted for rotation relatively to said body for operating said work gripping means, mechanism for transmitting such relative rotation of said member to said work gripping means, said mechanism automatically locking whereby said member will normally rotate at a speed bearing a fixed relation to the speed of rotation of said body, a motor having a single rotary power delivery member; and differential gearing having relatively rotatable parts respectively connected to said chuck body, said member and said power delivery part, the speed of rotation of said parts of said differential gearing being such that said motor will be without motion except when energized.

6. The combination with a chuck body, of work gripping means, a member mounted for rotation in either of opposite directions relatively to said body for operating said work gripping means, mechanism for transmitting such relative rotation of said member to said work gripping means, said mechanism automatically locking whereby said member will normally rotate at a speed bearing a fixed relation to the speed of rotation of said body, a reversible motor having a single rotary power delivery member; and differential gearing having relatively rotatable parts respectively connected to said chuck body, said member and said power delivery part, the speed of rotation of said parts of said differential gearing being such that said motor will be without motion except when energized.

7. The combination with a chuck having a body carrying jaws and self locking jaw operating mechanism, said mechanism comprising a part mounted for rotation in opposite directions relatively to said body, a pair of gears, a planetary pinion meshing with said gears, a carrier for said planetary pinions, a reversible motor connected in driving relation to one of said gears, the other of said gears connected in driving relation to said part, and said carrier connected in driving relation to said body.

8. The combination with a chuck having a body carrying jaws and self locking jaw operating mechanism, said mechanism comprising a part mounted for rotation in opposite directions relatively to said body, a pair of gears, a planetary pinion meshing with said gears, a carrier for said planetary pinions, a reversible motor connected in driving relation to one of said gears, the other of said gears connected in driving relation to said part, and said carrier connected in driving relation to said body for rotation at one-half the speed of the gear connected in driving relation to said part.

9. The combination with a chuck having a body carrying jaws and self locking jaw operating mechanism, said mechanism comprising a part mounted for rotation relatively to said body, a pair of gears, a planetary pinion meshing with said gears, a carrier for said planetary pinions, a motor connected in driving relation to one of said gears, the other of said gears connected in driving relation to said part, and said carrier connected in driving relation to said body.

10. The combination with a chuck having a body carrying jaws and self locking jaw operating mechanism, said mechanism comprising a part mounted for rotation relatively to said body, a pair of gears, a planetary pinion meshing with said gears, a carrier for said planetary pinions, a motor connected in driving relation to one of said gears, the other of said gears connected in driving relation to said part, and said carrier connected in driving relation to said body for rotation at one-half the speed of the gear connected in driving relation to said part.

11. The combination with a chuck having a body carrying work gripping means, jaw operating mechanism comprising a rotary part, said body and said part being rotatable relatively to each other, power means for causing such relative rotation, a pair of gears one of which is connected in driving relation to said power means and the other in driving relation to said part, a planetary pinion meshing with both gears, and means for giving said planetary pinion an orbital motion in fixed time relation to the speed of rotation of said chuck.

12. The combination with a chuck having a body carrying work gripping means, jaw operating mechanism comprising a rotary part, said body and said part being rotatable relatively to each other, power means for causing such relative rotation, a pair of gears one of which is connected in driving relation to said power means and the other in driving relation to said part, a planetary pinion meshing with both gears, and means for giving said pinion an orbital rotation about said gears at one-half the speed of rotation of said gear in driving relation to said part.

13. The combination with a chuck having a body carrying jaws, a rotary jaw operating part, power means for actuating said jaw operating part, differential mechanism connecting said power means to said part and to said body, said differential mechanism when said chuck is rotating in either of opposite directions having a resultant speed of zero revolutions at all speeds of rotation of said chuck.

14. The combination with a chuck having a body carrying jaws, a rotary jaw operating part, power means for actuating said jaw operating part, differential mechanism connected in driving relation to said power means and to said part, and means for driving said differential mechanism at a speed proportional to said chuck for imparting to said jaws motion independent of the speed of rotation of said chuck when said power means is energized.

In testimony whereof, I have signed my name to this specification.

SIDNEY E. HORTON.